(12) United States Patent
Song et al.

(10) Patent No.: US 11,440,254 B2
(45) Date of Patent: Sep. 13, 2022

(54) INNER CAVITY NEAR-NET-SHAPING DEVICE FOR MICRO CAST-ROLLING ADDITIVE MANUFACTURING OF LARGE-SCALE SPECIAL-SHAPED PIPE

(71) Applicant: Yanshan University, Qinhuangdao (CN)

(72) Inventors: Jianfeng Song, Qinhuangdao (CN); Younian Song, Qinhuangdao (CN); Wenwu Wang, Qinhuangdao (CN); Xuan He, Qinhuangdao (CN); Dong Wang, Qinhuangdao (CN); Yinggang Shi, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 263 days.

(21) Appl. No.: 16/952,369

(22) Filed: Nov. 19, 2020

(65) Prior Publication Data
US 2021/0197460 A1 Jul. 1, 2021

(30) Foreign Application Priority Data
Nov. 19, 2019 (CN) .......................... 201911136576.X

(51) Int. Cl.
*B29C 64/236* (2017.01)
*B33Y 30/00* (2015.01)
(Continued)

(52) U.S. Cl.
CPC ............ *B29C 64/236* (2017.08); *B21D 39/20* (2013.01); *B21D 41/02* (2013.01);
(Continued)

(58) Field of Classification Search
CPC ............ B23B 31/2025; B23B 31/2072; B23B 31/4006; B23B 31/4046; B23B 31/4066; B23B 31/4093
(Continued)

(56) References Cited

U.S. PATENT DOCUMENTS 2,226,078 A * 12/1940 Spahn .................... B23B 31/404
279/2.15
2,398,278 A * 4/1946 Haskell ................ B23Q 16/002
279/2.15
(Continued)

*Primary Examiner* — Jason L Vaughan
(74) *Attorney, Agent, or Firm* — IPRO, PLLC

(57) ABSTRACT

An inner cavity near-net-shaping device for micro cast-rolling additive manufacturing of large-scale special-shaped pipe, includes a main transmission assembly, an inner cavity near-net-shaping assembly and a main feed assembly. The inner cavity near-net-shaping assembly comprises an inner cavity mold, an expansion cylinder and an expansion push rod, the expansion cylinder is provided with a gap in a direction of a thin wall thickness thereof, an inner cavity surface of the expansion cylinder is evenly distributed along a circumferential direction thereof with the inner wedge-shaped slider, and the expansion push rod comprises a first shaft section, a second shaft section, an outer wedge-shaped slider and a third shaft section, an outer surface of the second shaft section of the expansion push rod is evenly distributed along a circumferential direction thereof with an outer wedge-shaped slider.

7 Claims, 4 Drawing Sheets

(51) Int. Cl.
*B21D 41/02* (2006.01)
*B29C 57/04* (2006.01)
*B21D 39/20* (2006.01)
*B23B 31/20* (2006.01)
*B23B 31/40* (2006.01)
*B29L 23/00* (2006.01)

(52) U.S. Cl.
CPC ...... *B23B 31/2072* (2021.01); *B23B 31/4093* (2013.01); *B29C 57/04* (2013.01); *B33Y 30/00* (2014.12); *B23B 31/4046* (2013.01); *B29L 2023/22* (2013.01)

(58) Field of Classification Search
USPC ........................................ 279/2.03, 2.11, 2.12
See application file for complete search history.

(56) References Cited

U.S. PATENT DOCUMENTS

| | | | | |
|---|---|---|---|---|
| 2,672,175 A | * | 3/1954 | Howard | B21D 41/026 |
| | | | | 72/393 |
| 2,914,330 A | * | 11/1959 | Wheeler | B25B 9/00 |
| | | | | 279/2.03 |
| 3,085,763 A | * | 4/1963 | Floyd, Jr. | B65H 75/242 |
| | | | | 242/573.8 |
| 3,997,176 A | * | 12/1976 | Wyckoff | B23B 31/406 |
| | | | | 279/2.15 |
| 4,530,231 A | * | 7/1985 | Main | B21D 41/02 |
| | | | | 72/393 |
| 4,768,791 A | * | 9/1988 | Whiting | B23B 23/00 |
| | | | | 279/2.12 |
| 2015/0369020 A1 | * | 12/2015 | Parsons | B21D 39/20 |
| | | | | 72/429 |

* cited by examiner

INNER CAVITY NEAR-NET-SHAPING DEVICE FOR MICRO CAST-ROLLING ADDITIVE MANUFACTURING OF LARGE-SCALE SPECIAL-SHAPED PIPE

TECHNICAL FIELD

The present invention relates to the field of near-net-shaping and additive manufacturing of special-shaped steel pipe for large-scale connecting pipes used in nuclear power, and in particular, to an inner cavity near-net-shaping device for micro cast-rolling additive manufacturing of large-scale special-shaped pipe.

BACKGROUND

Large-scale special-shaped connecting pipes for nuclear power are mainly used in nuclear power generators. They have special materials, irregular inner holes and irregular shapes and complex shapes, and because they need to withstand high temperature and high pressure steam under working conditions, they have strict requirements on microstructure and internal defects. Currently, they mainly rely on forging process to produce. The forging process has a long production process and a complex process, requiring large-scale forging equipment and flaw detection devices, so the production cost of large-scale connecting pipes remains high.

Large-scale steel pipes with irregular shapes are often used in industrial production. Due to their special shapes and large volume, compared to the common regular shape steel pipes in daily life that are manufactured by casting and rolling and other long process methods, they can be produced by welding when the shapes are regular and the wall thicknesses are small. With the development of science and technology, a more advanced near-net-shaping manufacturing method such as additive manufacturing has emerged, which can greatly shorten the manufacturing process and reduce intermediate links. At the same time, it can effectively control internal organization and defects, and can significantly reduce product production costs. For the manufacture of large irregular steel pipes, corresponding manufacturing equipment must be designed.

The irregular shape of the inner cavity of the special-shaped connecting pipe for nuclear power, and how to keep the position of the processed part fixed during the processing, make the processing by the conventional method technically limited, and an inner cavity forming device needs to be designed.

SUMMARY

In view of the problems existing in the prior art, the present invention provides an inner cavity near-net-shaping device for micro cast-rolling additive manufacturing of large-scale special-shaped pipe, which mainly solves the problem of maintaining the position of the workpiece fixed during processing, adapts to the manufacture of more large-scale irregular steel pipes, improves versatility, reduces production cycle, and improves efficiency.

The present invention provides an inner cavity near-net-shaping device for micro cast-rolling additive manufacturing of large-scale special-shaped pipe, and the device includes a main transmission assembly, an inner cavity near-net-shaping assembly and a main feed assembly. The main transmission assembly comprises a servo motor, a servo motor base, a main transmission coupling, a first main shaft bearing seat, a second main shaft bearing seat, a first main shaft lower slider, a second main shaft lower slider, a first bearing end cover, a second bearing end cover, a third bearing end cover, a fourth bearing end cover, a first main shaft bearing, a second main shaft bearing and a hexagon head bolt. The main feed assembly comprises a main guide, a ball screw, a stepping motor, a stepping motor seat, a coupling, a main feed ball screw nut, a first ball screw nut, a second ball screw nut, a ball screw bearing seat, a ball screw bearing, a first ball screw bearing end cover and a second ball screw bearing end cover. The inner cavity near-net-shaping assembly comprises an inner cavity mold, an expansion cylinder and an expansion push rod, the expansion cylinder is provided with a gap in a direction of a thin wall thickness thereof, an inner cavity surface of the expansion cylinder is evenly distributed along a circumferential direction thereof with the inner wedge-shaped slider, and the expansion push rod comprises a first shaft section, a second shaft section, an outer wedge-shaped slider and a third shaft section, an outer surface of the second shaft section of the expansion push rod is evenly distributed along a circumferential direction thereof with an outer wedge-shaped slider, a slope surface of the inner wedge-shaped slider is connected to a slope surface of the outer wedge-shaped slider, and the first shaft section of the expansion push rod passes through an inner diameter of the second bearing end cover, an inner diameter of the first main shaft bearing and an inner diameter of the first bearing end cover respectively and is connected to a second end of the main transmission coupling, and the third shaft section of the expansion push rod passes through an inner diameter of the third bearing end cover and an inner diameter of the fourth bearing end cover respectively and is connected to an inner diameter of the second main shaft bearing.

Compared with the prior art, the present invention has the advantages as follows.

First, by replacing the inner cavity mold of the inner cavity near-net-shaping assembly, near-net-shaping of the inner cavity of various types of connecting pipes for nuclear power can be achieved, and the expansion function can be realized through the movement of the feed structure. The process is relatively simple, and is easy to operate. At the same time, it reduces the labor intensity of workers, intermediate manufacturing links and the time to redesign new equipment, improves work efficiency, shortens the processing cycle, and can effectively control internal organization and defects, which has great practical application value.

Second, the structure is simple, easy to disassemble and assemble, can be used multiple times. Each part is replaceable, and has the characteristics of wide use, reduced production cost, stable performance, easy installation and implementation.

Figure 1:
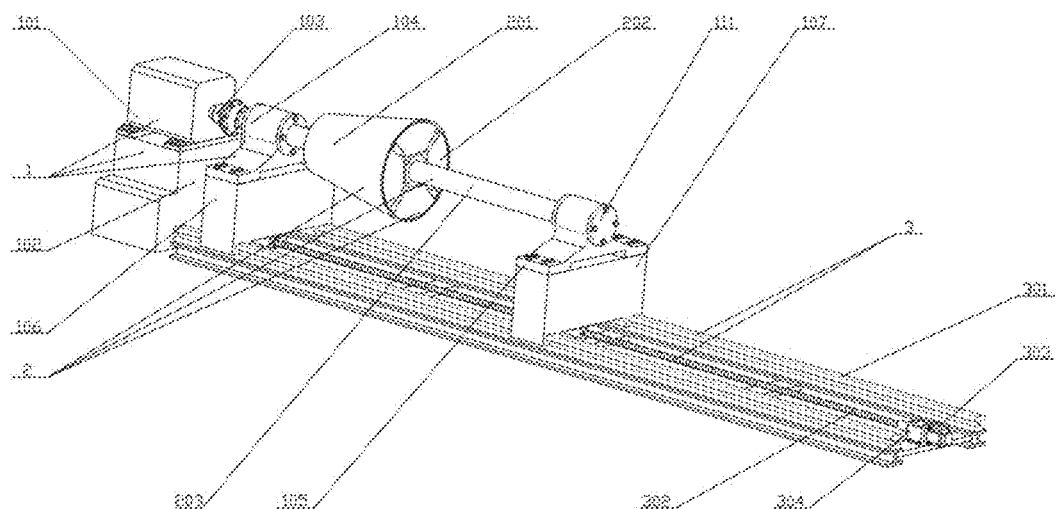
FIG. 1 is an overall schematic diagram of an inner cavity near-net-shaping device for micro cast-rolling additive manufacturing of large-scale special-shaped pipe according to the present invention.

MAIN REFERENCE SIGNS main transmission assembly 1, servo motor 101, servo motor base 102, main transmission coupling 103, first main shaft bearing seat 104, second main shaft bearing seat 105, first main shaft lower slider 106, second main shaft lower slider 107, first bearing end cover 108, second bearing end cover 109, third bearing end cover 110, fourth bearing end cover 111, first main shaft bearing 112, second main shaft bearing 113, hexagon head bolt 114, inner cavity near-net-shaping assembly 2, inner cavity mold 201, expansion cylinder 202, inner wedge-shaped slider 20201, expansion push rod 203, first shaft section 20301, second shaft section 20302, outer wedge-shaped slider 20303, third shaft section 20304, main feed assembly 3, main guide 301, ball screw 302, stepping motor 303, stepping motor seat 304, coupling 305, main feed ball screw nut 306, first ball screw nut 307, second ball screw nut 308, ball screw bearing seat 309, ball screw bearing 310, first ball screw bearing end cover 311, second ball screw bearing end cover 312.

DETAILED DESCRIPTION OF EMBODIMENTS

In order to detail the technical contents, structural features, achieved objectives and effects of the present invention, a detailed description will be given below in conjunction with the accompanying drawings of the specification.

An inner cavity near-net-shaping device for micro cast-rolling additive manufacturing of large-scale special-shaped pipe according to the present invention, as shown in FIG. 1, includes: a main transmission assembly 1, an inner cavity near-net-shaping assembly 2 and a main feed assembly 3.

Figure 2:
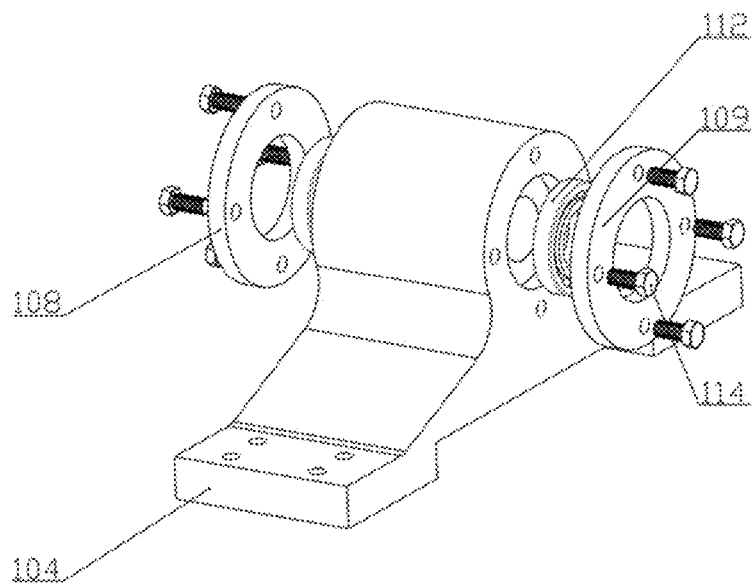
FIG. 2 is an exploded schematic diagram of a first main shaft bearing seat of a main transmission assembly in the inner cavity near-net-shaping device for micro cast-rolling additive manufacturing of large-scale special-shaped pipe according to the present invention.
Figure 3:
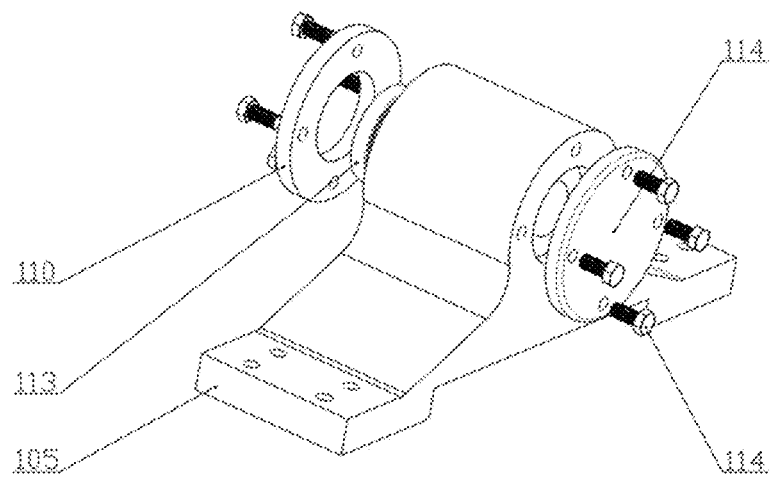
FIG. 3 is an exploded schematic diagram of overall structure of a second main shaft bearing seat of the main transmission assembly in the inner cavity near-net-shaping device for micro cast-rolling additive manufacturing of large-scale special-shaped pipe according to the present invention.

As shown in FIG. 2 and FIG. 3, the main transmission assembly comprises a servo motor 101, a servo motor base 102, a main transmission coupling 103, a first main shaft bearing seat 104, a second main shaft bearing seat 105, a first main shaft lower slider 106, a second main shaft lower slider 107, a first bearing end cover 108, a second bearing end cover 109, a third bearing end cover 110, a fourth bearing end cover 111, a first main shaft bearing 112, a second main shaft bearing 113 and a hexagon head bolt 114.

As shown in FIG. 1, the servo motor base 102 is horizontally provided on the ground, a housing of the servo motor 101 is fixedly connected to an upper surface of the servo motor base 102, and a lower surface of the first main shaft bearing seat 104 and a lower surface of the second main shaft bearing seat 105 are respectively fixedly connected to an upper surface of the first main shaft lower slider 106 and an upper surface of the second main shaft lower slider 107, a lower surface of the first main shaft lower slider 106 and a lower surface of the second main shaft lower slider 107 are slidingly connected to the main guide 301, and an outer diameter of the first main shaft bearing 112 and an outer diameter of the second main shaft bearing 113 are respectively connected to an inner diameter of the first main shaft bearing seat 104 and an inner diameter of the second main shaft bearing seat 105, the first bearing end cover 108 and the second bearing end cover 109 are respectively connected to two end faces of the first main shaft bearing seat 104, and the third bearing end cover 110 and the fourth bearing end cover 111 are respectively connected to two end faces of the second main shaft bearing seat 105, and a first end of the main transmission coupling 103 is connected to an output shaft of the servo motor 101.

Figure 8:
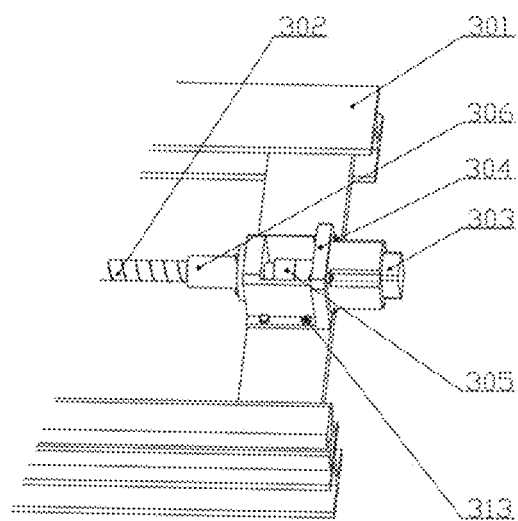
FIG. 8 is a structural schematic diagram of a motor end of a main feed assembly in the inner cavity near-net-shaping device for micro cast-rolling additive manufacturing of large-scale special-shaped pipe according to the present invention.
Figure 9:
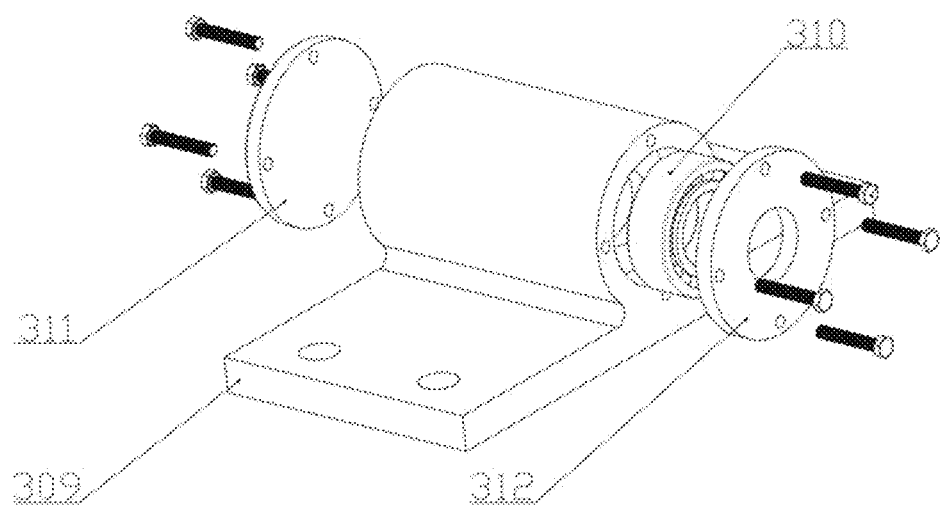
FIG. 9 is a structural schematic diagram of a bearing end of the main feed assembly in the inner cavity near-net-shaping device for micro cast-rolling additive manufacturing of large-scale special-shaped pipe according to the present invention.

As shown in FIG. 8 and FIG. 9, the main feed assembly 3 comprises a main guide 301, a ball screw 302, a stepping motor 303, a stepping motor seat 304, a coupling 305, a main feed ball screw nut 306, a first ball screw nut 307, a second ball screw nut 308, a ball screw bearing seat 309, a ball screw bearing 310, a first ball screw bearing end cover 311 and a second ball screw bearing end cover 312.

Figure 10:
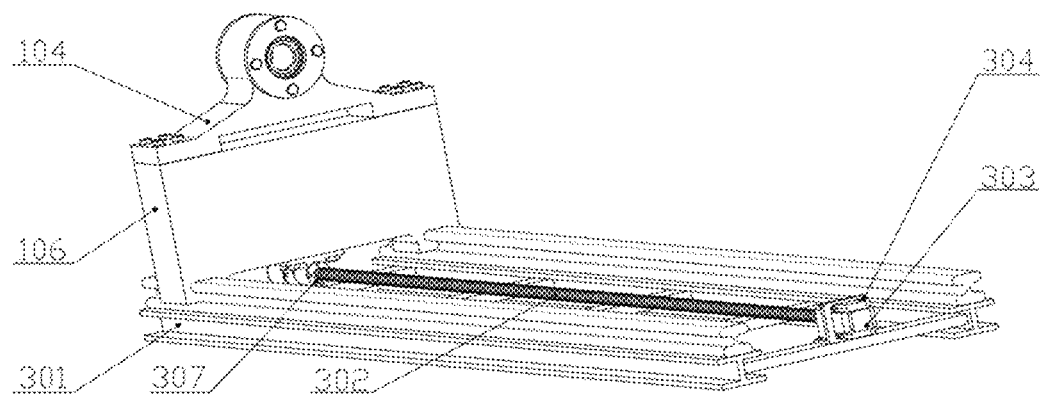
FIG. 10 is a structural schematic diagram of a first ball screw nut of the main feed assembly in the inner cavity near-net-shaping device for micro cast-rolling additive manufacturing of large-scale special-shaped pipe according to the present invention.
Figure 11:
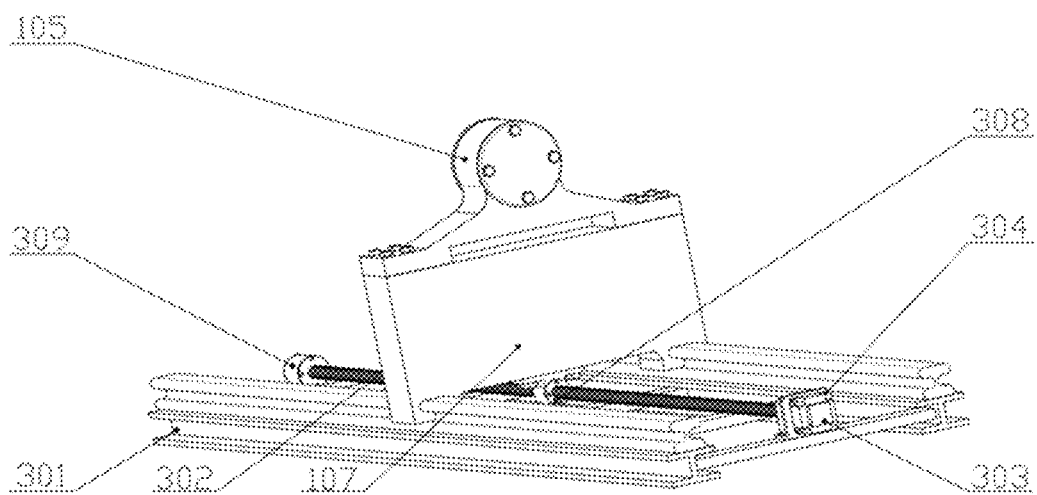
FIG. 11 is a structural schematic diagram of a second ball screw nut of the main feed assembly in the inner cavity near-net-shaping device for micro cast-rolling additive manufacturing of large-scale special-shaped pipe according to the present invention.

As shown in FIG. 10 and FIG. 11, the main guide 301 is horizontally provided on the ground, and the first ball screw nut 307 and the second ball screw nut 308 are respectively connected to an inner surface of the first main shaft lower slider 106 and an inner surface of the second main shaft lower slider 107. As shown in FIG. 9, a bottom surface of the ball screw bearing seat 309 is fixedly connected to a first end of the main guide 301, an outer diameter of the ball screw bearing 310 is connected to an inner diameter of the ball screw bearing seat 309, and the first ball screw bearing end cover 311 and the second ball screw bearing end cover 312 are respectively connected to both end faces of the ball screw bearing seat 309, a lower surface of the stepping motor seat 304 is fixedly connected to a second end of the main guide 301. As shown in FIG. 8, a housing of the stepping motor 303 is fixedly connected to a first end of the stepping motor seat 303, the main feed ball screw nut 306 is fixedly connected to a second end of the stepping motor seat 304, and an input end of the ball screw 302 passes through an inner diameter of the main feed ball screw nut 306 and is connected to an output shaft of the stepping motor 303 through the coupling 305, and a free end of the ball screw 302 passes through an inner diameter of the second ball screw nut 308 and an inner diameter of the first ball screw nut 307 respectively and is connected to an inner diameter of the ball screw bearing 310.

Figure 4:
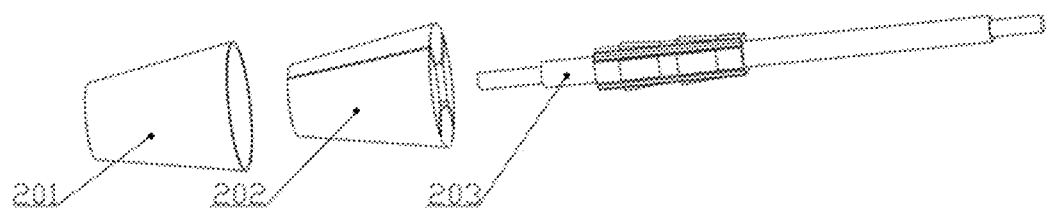
FIG. 4 is an exploded schematic diagram of overall structure of an inner cavity near-net-shaping assembly in the inner cavity near-net-shaping device for micro cast-rolling additive manufacturing of large-scale special-shaped pipe according to the present invention.
Figure 7:
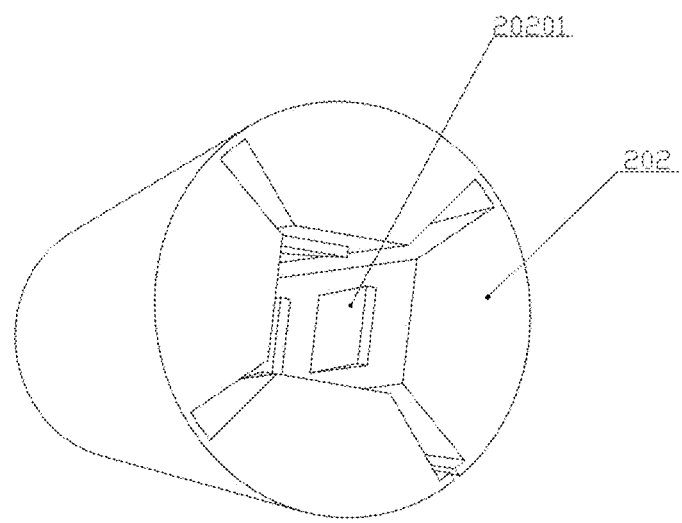
FIG. 7 is a schematic diagram of an expansion cylinder of the inner cavity near-net-shaping assembly in the inner cavity near-net-shaping device for micro cast-rolling additive manufacturing of large-scale special-shaped pipe according to the present invention.

As shown in FIG. 4, the inner cavity near-net-shaping assembly comprises an inner cavity mold 201, an expansion cylinder 202 and an expansion push rod 203. The material of the inner cavity mold 201 is the same as the material of the processed workpiece. After processing, it can be disassembled and is reusable. As shown in FIG. 7, the expansion cylinder 202 is provided with a gap in the direction of the thin wall thickness thereof, during the expansion process, the outer diameter of the expansion cylinder 202 can be increased within a certain range. An inner cavity surface of the expansion cylinder 202 is evenly distributed along a circumferential direction thereof with an inner wedge-shaped slider 20201. The expansion cylinder 202 is not completely closed. For the processed workpiece of a certain size range, it can always be kept in an expansion state to ensure diversification of the processed workpiece.

Figure 5:
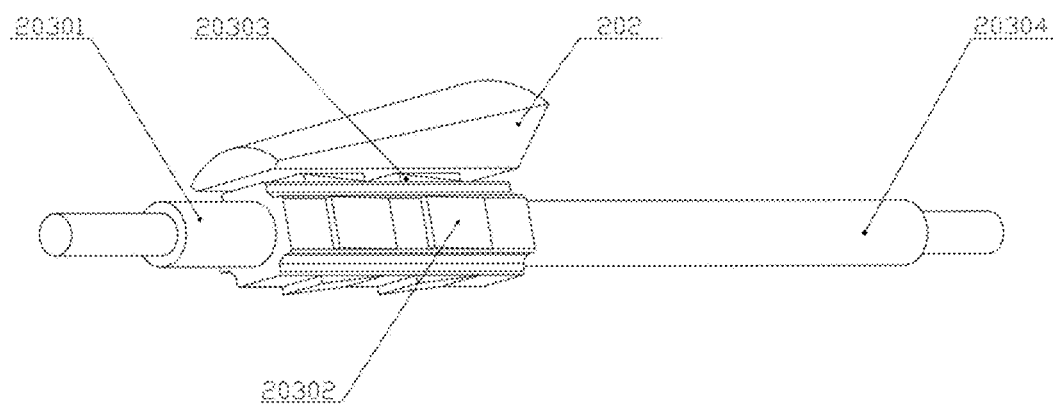
FIG. 5 is an overall schematic diagram of an expansion push rod of the inner cavity near-net-shaping assembly in the inner cavity near-net-shaping device for micro cast-rolling additive manufacturing of large-scale special-shaped pipe according to the present invention.
Figure 6:
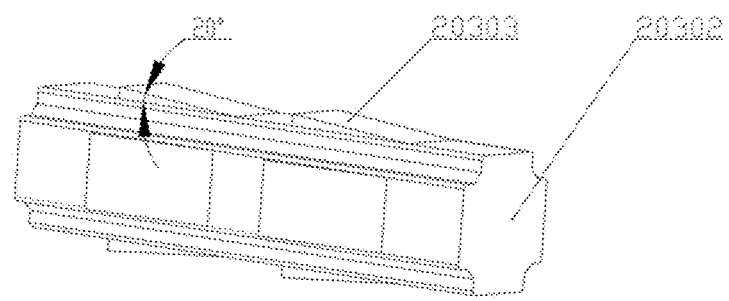
FIG. 6 is a partial schematic diagram of the expansion push rod of the inner cavity near-net-shaping assembly in the inner cavity near-net-shaping device for micro cast-rolling additive manufacturing of large-scale special-shaped pipe according to the present invention.

As shown in FIG. 5, the expansion push rod 203 comprises a first shaft section 20301, a second shaft section 20302, an outer wedge-shaped slider 20303 and a third shaft section 20304. As shown in FIG. 6, an outer surface of the second shaft section 20302 of the expansion push rod 203 is evenly distributed along a circumferential direction thereof with an outer wedge-shaped slider 20303, a slope surface of the inner wedge-shaped slider 20201 is connected to a slope surface of the outer wedge-shaped slider 20303. Relative displacement can occur between the slope surface of the expansion cylinder wedge-shaped slider 20201 and the slope surface of the expansion push rod wedge-shaped slider 20303. The expansion cylinder 202 is then pushed up to produce radial displacement, and the inner wall of the entire expansion cylinder 202 moves in the direction of expanding the outer diameter, and the outer circumferential surface of the expansion cylinder 202 tightly fits the inner cavity surface of the inner cavity mold 201, and finally the inner cavity mold 201 is expanded.

The first shaft section 20301 of the expansion push rod 203 passes through an inner diameter of the second bearing end cover 109, an inner diameter of the first main shaft bearing 112 and an inner diameter of the first bearing end cover 108 respectively and is connected to a second end of the main transmission coupling 103, and the third shaft section of the expansion push rod 203 passes through an inner diameter of the third bearing end cover 110 and an inner diameter of the fourth bearing end cover 111 respectively and is connected to an inner diameter of the second main shaft bearing 113.

As shown in FIG. 6 and FIG. 7, the inner wedge-shaped slider 20201 and the outer wedge-shaped slider 20203 appear in pairs, and have an spacing angle of 90° along a circumferential direction, and two sliders of each pair of wedge-shaped sliders are distributed along an axial direction, and the inner wedge-shaped slider 20201 and the outer wedge-shaped slider 20203 have a same inclination angle of 20° but have opposite inclination directions, a radial size of the inner wedge-shaped slider 20201 is smaller than a radial size of the outer wedge-shaped slider 20203.

As shown in FIG. 2 and FIG. 3, the first bearing end cover 108, the fourth bearing end cover 111 and the first ball screw bearing end cover 311 are stuffy cover, the second bearing end cover 109, the third bearing end cover 110 and the second ball screw bearing end cover 312 are blanking covers, and a base of the servo motor 101 and a bottom surface of the main guide 301 are in a same plane.

As shown in FIG. 1, the first main shaft bearing 112, the second main shaft bearing 113, the first bearing end cover 108, the second bearing end cover 109, the third bearing end cover 110, the fourth bearing end cover 111, the inner cavity mold 201, the expansion cylinder 202 and the expansion push rod 203 are coaxial, the first ball screw nut 307, the second ball screw nut 308, the ball screw 302, the main feed ball screw nut 306, the ball screw bearing 310, the first ball screw bearing end cover 311 and the second ball screw bearing end The cover 312 is coaxial.

As shown in FIG. 4, an outer shape of the inner cavity mold 201 is the same as an outer shape of the expansion cylinder 202, an inner diameter of the inner cavity mold 201 is equal to an outer diameter of the expansion cylinder 202, and the length of the gap provided on a side of the expansion cylinder 202 is equal to the length of the expansion cylinder 202, and the gap runs along the axial direction of the expansion cylinder from the smaller diameter surface to the larger diameter surface, so that the expansion cylinder 202 is not completely closed. The number of outer wedge-shaped slider 20303 is equal to the number of inner wedge-shaped slider 20201, and both are four pairs. The four pairs of wedge-shaped sliders on the inner surface of expansion cylinder 202 and the four pairs of wedge-shaped sliders on the outer surface of expansion push rod 203 are matched to form moving pairs, namely, can expand the inner cavity mold 201.

The inner cavity near-net-shaping device for micro cast-rolling additive manufacturing of large-scale special-shaped pipe according to the present invention will be further described as follows in conjunction with embodiments.

First, according to the inner diameter size of the special-shaped connecting pipes for large nuclear power plants, the inner cavity mold 201 with the same outer diameter and taper as the connecting pipe is used. Then, on this basis, an expansion cylinder 202 whose outer diameter and taper are exactly the same as the inner diameter and taper of the cavity mold 201 is used. The expansion cylinder 202 has a gap in the wall thickness direction, and is not completely closed. On the inner wall of the expansion cylinder 202, there are four pairs of inner wedge-shaped sliders 20201 evenly distributed along the circumferential direction, and the slope surface of the slider has an inclination angle of 20°. On the four sides of the expansion push rod 203, there is an outer wedge-shaped slider 20303 with the same size, shape, number and distribution as the expansion cylinder 202, and its tilt direction is opposite to that of the inner wedge-shaped slider 20201 of the expansion cylinder 202.

Next, the expansion push rod 203 is pushed into the inner cavity of the expansion cylinder 202, the slope surface of the first the inner wedge-shaped slider of the expansion cylinder 202 and the slope surface of the outer wedge-shaped slider of the expansion push rod 203 are placed relative to each other, and then the expansion cylinder 202 is fixed. With the assistance of the main feed mechanism, the expansion push rod 203 is embedded into the inner cavity of the expansion cylinder 202, then the expansion cylinder 202 is fixed, and the inner cavity mold 201 is sleeved on the expansion cylinder 202. The main feed assembly continues to run, the inner wedge-shaped slider of the expansion cylinder 202 and the outer wedge-shaped slider of the expansion push rod 203 are relatively misaligned, causing displacement in the radial direction. Because the expansion cylinder 202 is not completely closed, there is a gap in the wall thickness direction, and under the action of the expansion force, the gap gradually increases, so that the outer diameter of the expansion cylinder 202 continues to increase, thereby expanding the inner cavity mold 201. After assembling the inner cavity near-net-shaping assembly 2, it is connected to the main transmission assembly 1 and the main feed assembly 3 to complete the assembling of the entire device.

Then, the servo motor 101 in the main transmission assembly 1 is started up, and the torque is transmitted to the expansion push rod 203 through the main transmission coupling 102, thereby driving the entire inner cavity near-net-shaping assembly to rotate.

Then, the stepping motor 303 in the main feed assembly 3 is started up. Through the coupling 305, the torque is transmitted to the ball screw 302, and the ball screw 302 rotates. Because the first main shaft bearing seat lower slider 106 is fixedly connected to the first main shaft bearing seat lower slider ball screw nut 307, and the second main shaft bearing seat lower slider 107 is fixedly connected with the second main shaft bearing seat lower slider ball screw nut 308. The internal thread of the first main shaft bearing seat lower slider ball screw nut 307 is mated with the external thread of the ball screw 302, and the internal thread of the second main shaft bearing seat lower slider ball screw nut 308 is mated with the external thread of the ball screw 302, so the first main shaft bearing seat lower slider 106 and the second main shaft bearing seat slider 107 slides along the main guide 301; the first main shaft bearing seat 104 and the second main shaft bearing seat 105, as well as the parts fixedly connected thereon, and the inner cavity near-net-shaping assembly also follow the movement. By adjusting the forward and reverse rotation of the stepping motor, the feed and retreat functions can be realized.

The above-mentioned embodiments only describe the preferred embodiments of the present invention and do not limit the scope of the present invention. Without departing from the design spirits of the present invention, those of ordinary skill in the art have made various modifications and improvements to the technical solutions of the present invention. Such modifications and improvements shall fall within the protection scope determined by the claims of the present invention.

What is claimed is:

1. An inner cavity near-net-shaping device for micro cast-rolling additive manufacturing of large-scale special-shaped pipe, comprising: a main transmission assembly, an inner cavity near-net-shaping assembly and a main feed assembly, wherein
   the main transmission assembly comprises a servo motor, a servo motor base, a main transmission coupling, a first main shaft bearing seat, a second main shaft bearing seat, a first main shaft lower slider, a second main shaft lower slider, a first bearing end cover, a second bearing end cover, a third bearing end cover, a fourth bearing end cover, a first main shaft bearing, a second main shaft bearing and a hexagon head bolt; and
   the main feed assembly comprises a main guide, a ball screw, a stepping motor, a stepping motor seat, a coupling, a main feed ball screw nut, a is first ball screw nut, a second ball screw nut, a ball screw bearing seat, a ball screw bearing, a first ball screw bearing end cover and a second ball screw bearing end cover; and
   the inner cavity near-net-shaping assembly comprises an inner cavity mold, an expansion cylinder and an expansion push rod, the expansion cylinder is provided with a gap in a direction of a thin wall thickness thereof, an inner cavity surface of the expansion cylinder is evenly distributed along a circumferential direction thereof with an inner wedge-shaped slider, and the expansion push rod comprises a first shaft section, a second shaft section, an outer wedge-shaped slider and a third shaft section, an outer surface of the second shaft section of the expansion push rod is evenly distributed along a circumferential direction thereof with an outer wedge-shaped slider, a slope surface of the inner wedge-shaped slider is connected to a slope surface of the outer wedge-shaped slider, and the first shaft section of the expansion push rod passes through an inner diameter of the second bearing end cover, an inner diameter of the first main shaft bearing and an inner diameter of the first bearing end cover respectively and is connected to a second end of the main transmission coupling, and the third shaft section of the expansion push rod passes through an inner diameter of the third bearing end cover and an inner diameter of the fourth bearing end cover respectively and is connected to an inner diameter of the second main shaft bearing.

2. The inner cavity near-net-shaping device for micro cast-rolling additive manufacturing of large-scale special-shaped pipe according to claim 1, wherein in the main transmission assembly, the servo motor base is horizontally provided on the ground, a housing of the servo motor is fixedly connected to an upper surface of the servo motor base, and a is lower surface of the first main shaft bearing seat and a lower surface of the second main shaft bearing seat are respectively fixedly connected to an upper surface of the first main shaft lower slider and an upper surface of the second main shaft lower slider, a lower surface of the first main shaft lower slider and a lower surface of the second main shaft lower slider are slidingly connected to the main guide, and an outer diameter of the first main shaft bearing and an outer diameter of the second main shaft bearing are respectively connected to an inner diameter of the first main shaft bearing seat and an inner diameter of the second main shaft bearing seat, the first bearing end cover and the second bearing end cover are respectively connected to two end faces of the first main shaft bearing seat, and the third bearing end cover and the fourth bearing end cover are respectively connected to two end faces of the second main shaft bearing seat, and a first end of the main transmission coupling is connected to an output shaft of the servo motor.

3. The inner cavity near-net-shaping device for micro cast-rolling additive manufacturing of large-scale special-shaped pipe according to claim 2, wherein the first bearing end cover, the fourth bearing end cover and the first ball screw bearing end cover are stuffy covers, and the second bearing end cover, the third bearing end cover and the second ball screw bearing end cover are blanking covers, a base of the servo motor and a bottom surface of the main guide are in a same plane.

4. The inner cavity near-net-shaping device for micro cast-rolling additive manufacturing of large-scale special-shaped pipe according to claim 1, wherein in the main feed assembly, the main guide is horizontally provided on the ground, and the first ball screw nut and the second ball screw nut are respectively connected to an inner surface of the first main shaft lower slider and an inner surface of the second main shaft lower slider, a bottom surface of the ball screw bearing seat is fixedly connected to a first end of the main guide, an outer diameter of the ball screw bearing is connected to an inner diameter of the ball screw bearing seat, and the first ball screw bearing end cover and the second ball screw bearing end cover are respectively connected to both end faces of the ball screw bearing seat, a lower surface of the stepping motor seat is fixedly connected to a second end of the main guide, and a housing of the stepping motor is fixedly connected to a first end of the stepping motor seat, the main feed ball screw nut is fixedly connected to a second end of the stepping motor seat, and an input end of the ball screw passes through an inner diameter of the main feed ball screw nut and is connected to an output shaft of the stepping motor through the coupling, and a free end of the ball screw passes through an inner diameter of the second ball screw nut and an inner diameter of the first ball screw nut respectively and is connected to an inner diameter of the ball screw bearing.

5. The inner cavity near-net-shaping device for micro cast-rolling additive manufacturing of large-scale special-shaped pipe according to claim 1, wherein in the inner cavity near-net-shaping assembly, the inner wedge-shaped slider and the outer wedge-shaped slider appear in pairs, and have an spacing angle of 90° along a circumferential direction, and two sliders of each pair of wedge-shaped sliders are distributed along an axial direction, and the inner wedge-shaped slider and the outer wedge-shaped slider have a same inclination angle of 20° but have opposite inclination directions, a radial size of the inner wedge-shaped slider is smaller than a radial size of the outer wedge-shaped slider.

6. The inner cavity near-net-shaping device for micro cast-rolling additive manufacturing of large-scale special-shaped pipe according to claim 5, wherein an outer shape of the inner cavity mold is the same as an outer shape of the expansion cylinder, an inner diameter of the inner cavity mold is equal to an outer diameter of the expansion cylinder, and a length of the gap provided on the expansion cylinder in the direction of the thin wall thickness is equal to a length of the expansion cylinder, and the gap runs along an axial direction of the expansion cylinder from a smaller diameter surface to a larger diameter surface, and the number of the outer wedge-shaped slider is equal to the number of the inner wedge-shaped slider equal, both of which are four pairs.

7. The inner cavity near-net-shaping device for micro cast-rolling additive manufacturing of large-scale special-shaped pipe according to claim 1, wherein the first main shaft bearing, the second main shaft bearing, the first bearing end cover, the second bearing end cover, the third bearing end cover, the fourth bearing end cover, the inner cavity mold, the expansion cylinder and the expansion push rod are coaxial, the first ball screw nut, the second ball screw nut, the ball screw, the main feed ball screw nut, the ball screw bearing, the first ball screw bearing end cover and the second ball screw bearing end cover are coaxial.

* * * * *